3,014,894
POLYURETHANE PLASTICS
Erwin Müller, Otto Bayer, and Siegfried Petersen, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed June 5, 1957, Ser. No. 663,625
Claims priority, application Germany June 7, 1956
6 Claims. (Cl. 260—75)

This invention relates generally to polyurethane plastics and more particularly to novel polyurethane plastics having rubber-like characteristics and to a method for making the same.

It has been proposed heretofore to manufacture polyurethane plastics having rubber-like characteristics by reacting an organic compound having at least two reactive hydrogen atoms with a polyisocyanate. Processes suitable for making such elastomeric products are disclosed, for example, in U.S. Patents 2,621,166, 2,620,516, 2,729,618, 2,764,565 and 2,778,810. In accordance with these processes, an organic compound having reactive hydrogen atoms, such as, for example, a polyester, a polyether glycol, a polythioether, a polyester amide or the like, is reacted with an organic polyisocyanate. The resulting isocyanate-modified organic compound having NCO groups is then reacted with a chain-extender or cross-linking agent which may be water, a suitable organic diamine, a polyhydric alcohol, such as glycerine, a glycol, or the like. By varying the proportions of the components used in preparing the polyurethane plastics and by varying the reaction conditions, it is possible to produce elastomeric products having predetermined properties. For example, the tensile strength, elasticity, elongation and tear resistance of a rubber-like polyurethane are somewhat dependent upon the components used in preparing the plastic. The heretofore available polyurethane plastics have thus been found admirably suited for use in many applications where rubber has been used. It has been found, however, that most of the polyurethane plastics heretofore available have had a relatively low resistance to tearing if the hardness of the polyurethane is relatively low. In other words, when the polyurethane plastic is relatively soft, the tear resistance is too low for some purposes.

It is therefore an object of this invention to provide a polyurethane plastic devoid of the foregoing disadvantage. Another object of the invention is to provide an improved polyurethane plastic which is relatively soft and has a comparatively high tear resistance at a given softness. Still another object of the invention is to provide a method for making polyurethane plastics which have a relatively high tear resistance at a given hardness. A further object is to provide relatively soft polyurethanes having improved tear resistance. A still further object of the invention is to improve the tear resistance of soft polyurethane plastics.

Generally speaking, the foregoing objects and others are accomplished in accordance with this invention by providing a method for making polyurethane plastics which involves reacting an organic compound having at least two reactive hydrogen atoms and a molecular weight of at least about 1,000 with an aromatic diisocyanate containing an azo grouping in the molecule. More specifically, the invention contemplates a polyurethane plastic having improved tear resistance and a method for making the same which involves reacting an organic compound having at least two reactive hydrogen atoms and a molecular weight of at least about 1,000 with an organic diisocyanate which contains at least one azo grouping in the molecule. The reactants may include an organic compound having at least two reactive hydrogen atoms capable of reacting with an isocyanate and having a molecular weight less than about 500. In most instances, not substantially more than 10% of the organic compound having a molecular weight of less than 500 will be used in the reaction mixture. Certain advantageous characteristics in the elastomeric polyurethane plastic are obtained from such a mixture which are not obtained when the reaction liquid contains only compounds having reactive hydrogen atoms which have a molecular weight of at least 1,000. In other words, while at least a portion of the organic compound containing the reactive hydrogen atoms must have a molecular weight of at least 1,000, this compound can be mixed with other organic compounds having reactive hydrogen atoms and a molecular weight of less than about 500.

Any suitable organic compound having at least two reactive hydrogen atoms capable of forming a polyurethane when reacted with an organic polyisocyanate and having a molecular weight of at least 1,000 may be utilized, but it is preferred to use an organic compound of this type having a molecular weight of at least about 1,500. Suitable organic compounds having reactive hydrogen atoms include any suitable polyester having the required molecular weight and which is linear or predominantly linear, prepared by thermal condensation of a suitable polyhydric alcohol, preferably a glycol, such as, for example, ethylene glycol, diethylene glycol, propylene glycol, 1,3-butylene glycol, 1,4-butylene glycol, or the like, with any suitable dicarboxylic acid, such as, for example, succinic acid, adipic acid, phthalic acid, or the like. Preferably, at least two mols polyhydric alcohol per mol dicarboxylic acid are used to provide a compound having terminal hydroxyl groups instead of terminal carboxyl groups. Polythioethers, such as those prepared by condensing a suitable thioglycol such as thiodiglycol, polyethers prepared by condensing ethylene oxide or propylene oxide or by condensing ethylene oxide or propylene oxide with a glycol such as ethylene glycol or trihydric alcohol such as trimethylol propane or glycerine or polymers obtained by polymerizing tetrahydrofuran, may also be utilized as the reactant having the molecular weight of at least 1,000.

Lower molecular weight polyesters, polyethers, polythioethers or polyester amides may be used as the compound having the molecular weight of less than 500 to be mixed with the compound having the molecular weight of at least 1,000. Water and any suitable monomeric polyhydric alcohol, such as a glycol including butane diol, ethylene glycol, propylene glycol, diethylene glycol, and the like, or any other suitable polyhydric alcohols such as trimethylol propane, glycerine and the like are examples of other suitable compounds having at least two reactive hydrogen atoms and a molecular weight of less than 500. Other compounds of this type include the glycols having urea, urethane, carbamide and ester groups as well as those glycols having tertiary nitrogen atoms. Still other glycols which are suitable for the purpose are those having aromatic ring systems, such as, for example, 1,5-naphthalene-β-dihydroxy ethylether. Diamines such as o-dichlorobenzidine, 2,5-dichloro-p-phenylene diamine and 3,3'-dichlorodiaminodiphenyl methane may also be utilized as the organic compound having reactive hydrogen atoms and a molecular weight of less than about 500.

Any suitable organic diisocyanate having at least one azo grouping in the molecule may be used in accordance with the process provided by this invention. At least the theoretical amount of diisocyanate required to react with all of the reactive hydrogen atoms of the organic compound, and preferably an excess, must be utilized. Such compounds have the general formula

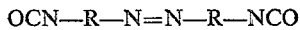

wherein R is an aromatic radical. Compounds of this general type include the following:

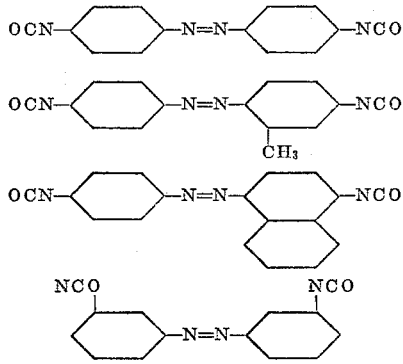

The invention also contemplates reacting a suitable organic compound having at least two reactive hydrogen atoms capable of forming a polyurethane with the novel organic diisocyanates having azo groups and at the same time with other organic diisocyanates not containing azo groups. In other words, in preparing the polyurethane plastics in accordance with this invention the organic diisocyanates having azo groups may be mixed with other organic diisocyanates not having azo groups and the diisocyanates in this mixture may be reacted with the organic compound having the reactive hydrogen atoms. It is also possible to mix the organic compound having the reactive hydrogen atoms simultaneously with two separate and different diisocyanates, one being a diisocyanate having azo groups and the other being an organic diisocyanate not having the azo groups. It has been found particularly advantageous to react the organic compounds having reactive hydrogen atoms with organic diisocyanates containing urethdione rings or urea groups in the molecule and, at the same time, reacting some of the organic compounds having reactive hydrogen atoms with one of the organic diisocyanates having an azo group in its molecule.

In accordance with one method provided by this invention, the condensation or polymerization product having hydroxyl groups or other groups containing a reactive hydrogen atom and a molecular weight of at least 1,000 is mixed with the organic compound having both isocyanate groups and azo groups or a mixture of such a diisocyanate and other organic diisocyanates not having azo groups and the resulting mixture is then heated to an elevated temperature under substantially anhydrous conditions to bring about reaction between the hydroxyl groups and the isocyanate groups. The theoretical amount or an excess of diisocyanate is used over that required to react with all of the reactive hydrogen atoms. The melt resulting from the reaction between the two components is then poured into molds and heated until a cross-linked product is obtained.

In this embodiment of the invention, there may also be obtained a crumbly material which may be worked into sheets on a rubber mill or roller or it may be pressed in molds. The invention thus contemplates not only a process wherein a castable melt is produced, but also a process where a solid crumbly material is produced which may be further processed and reacted by milling on a suitable rubber mill in the presence of an organic diisocyanate.

As pointed out hereinbefore, in some instances, it is desirable to use a mixture of a condensation or polymerization product having reactive hydrogen atoms and a molecular weight of at least 1,000 with another condensation or polymerization product having a molecular weight of less than 500 or, in some instances, a compound having a molecular weight of less than 500 which is a monomeric compound. In such instances, the amount of diisocyanate having azo groups utilized is equal to or larger than that theoretically required to react with all of the reactive hydrogen atoms in both compounds, that is in the compound having a molecular weight of at least 1,000 and the compound having a molecular weight of less than 500.

In accordance with another form of the invention, the condensation or polymerization product having the molecular weight of at least 1,000 may be first reacted under substantially anhydrous conditions with an organic diisocyanate having at least one azo group to provide a product having terminal NCO groups and then sufficient compound having a molecular weight of less than 500 may be added to bring about cross-linking of the adduct or prepolymer. The cross-linking or chain-extending compounds having a molecular weight of less than 500 may be used in any suitable amount, but preferably in the range of from about 1% to about 10% by weight based on the amount of polymerization or condensation product used. In a process of this type, where the chain-extender is added after the reaction between the compound having the molecular weight of at least 1,000 and the organic diisocyanate having the azo group, there is a further lengthening of the chain through the free isocyanate groups on the adduct or prepolymer obtained in the first reaction and simultaneously cross-linking of the lengthened chain is produced. One modification of this form of the invention involves the use of more than enough chain-extender having a molecular weight of less than 500 than is required to react with all of the free isocyanate groups present in the adduct and the resultant residual amount of free reactive hydrogen atoms is caused to react by mixing with more diisocyanates having azo groups.

According to a still further modification in the process provided by this invention, it is possible to operate in such a manner that initially a deficiency of diisocyanate having azo groups is used and the resulting isocyanate-modified condensation or polymerization product obtained from the compound having at least two reactive hydrogen atoms and a molecular weight of 1,000 is mixed with the compound having reactive hydrogen atoms and a molecular weight of less than 500. The compound having the lower molecular weight is added in an amount of from about 1 to about 10% based on the polymerization or condensation product used. Additional organic diisocyanate having azo groups is also added to the mixture in such an amount that sufficient isocyanate radicals are available to react with all of the existing hydroxyl groups in the mixture.

In those embodiments wherein organic diisocyanate having azo groups is added in two steps, it may be sufficient for many purposes to add a diisocyanate containing azo groups in one of the steps while an ordinary organic diisocyanate not having azo groups or an organic diisocyanate having urea or urethane groups may be used in the second step.

The present process wherein diisocyanates having azo groups are substituted for the diisocyanate heretofore used produces an elastomeric product having many advantages including an improved tear resistance at a given softness. By suitable choice of the components and proportions, it is possible to obtain products which are superior to the prior known polyurethanes in physical characteristics.

*Example 1*

Using a kneading machine, about 250 grams of 4,4'-azobenzene diisocyanate are incorporated by stirring into about 1 kilogram of a polyester dehydrated in vacuo at about 130° C., this polyester being obtained from 1 mol of adipic acid and 1.1 mols of ethylene glycol and having an hydroxyl number of about 55 and an acid number of about 1. After approximately 5 to 10 minutes, a clear reddish colored melt has formed at a condensation temperature of about 110°–120° C. and about 10 cc. of water are incorporated by stirring into the said melt after another 10 minutes. It is very soon possible to detect a considerable rise in viscosity as well as evolution of carbon dioxide, and after another 10–15 minutes, a crumbly material has formed which can be drawn out on a roller to form a sheet and which can be molded at about 150°–160° C. There is obtained an elastomeric material with the following properties:

| | |
|---|---|
| Strength _____kg./cm.² | 284 |
| Elongation _____percent | 690 |
| Permanent elongation _____do | 53 |
| Tear resistance _____kg./cm. | 56 |
| Elasticity _____percent | 51 |
| Hardness _____° Shore | 64 |
| Loading at 300% elongation _____kg./cm.² | 60 |

*Example 2*

After about 200 grams of the glycol-adipic acid polyester mentioned in Example 1 have been dehydrated at about 130° C. at about 12 mm. pressure, about 50 g. of 4,4'-azobenzene diisocyanate are incorporated therein by stirring at the same temperature. At approximately 135°–140° C., a clear homogeneous melt is formed, into which is incorporated by stirring about 5 g. of a mixture consisting of about 4 g. of butanediol-(1,4) and about 1 g. of trimethylol propane. The homogeneous melt is now poured into preheated molds and further heated for about 24 hours at about 100° C. in order to complete the reaction. The molded elements formed have the following mechanical properties:

| | |
|---|---|
| Strength _____kg./cm.² | 202 |
| Elongation _____percent | 620 |
| Permanent elongation _____do | 54 |
| Tear resistance _____kg./cm. | 36 |
| Elasticity _____percent | 45 |
| Hardness _____° Shore | 73 |
| Loading at 300% elongation _____kg./cm.² | 60 |

When about 5 g. of a mixture consisting of about 4 g. of butanediol-(1,4) and about 2 g. of trimethylol propane is used while maintaining the experimental conditions and proportions mentioned above, a product is obtained which has the following mechanical properties:

| | |
|---|---|
| Strength _____kg./cm.² | 274 |
| Elongation _____percent | 510 |
| Permanent elongation _____do | 80 |
| Tear resistance _____kg./cm. | 59 |
| Elasticity _____percent | 52 |
| Hardness _____° Shore | 75 |
| Loading at 300% elongation _____kg./cm.² | 78 |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:
1. A method of preparing a polyurethane plastic which comprises reacting an isocyanate having the formula

$$OCN-R-N=N-R-NCO$$

wherein R is selected from the group consisting of a benzene ring and a naphthalene ring with an organic compound having a molecular weight of at least about 1000 and terminal alcoholic hydroxyl groups and selected from the group consisting of a polyester prepared from an excess of a glycol and a dicarboxylic acid, a polyalkylene ether having from 2 to 3 alcoholic hydroxyl groups and a polythioether glycol, said isocyanate being in an amount at least equivalent to the theoretical amount thereof required to react with all of the hydroxyl groups of said organic compound.

2. A method of preparing a polyurethane plastic which comprises reacting an isocyanate having the formula $$OCN-R-N=N-R-NCO$$

wherein R is selected from the group consisting of a benzene ring and a naphthalene ring with an organic compound having a molecular weight of at least about 1000 and terminal alcoholic hydroxyl groups and selected from the group consisting of a polyester prepared from an excess of a glycol and a dicarboxylic acid, a polyalkylene ether having from 2 to 3 alcoholic hydroxyl groups and a polythioether glycol, said isocyanate being in an amount at least equivalent to the theoretical amount thereof required to react with all of the hydroxyl groups of said organic compound, and reacting the resulting product with a chain-extending agent selected from the group consisting of water and an organic compound having a molecular weight of less than 500 and containing groups containing reactive hydrogen.

3. A method of preparing a cast polyurethane elastomer which comprises mixing an isocyanate having the formula $$OCN-R-N=N-R-NCO$$

wherein R is selected from the group consisting of a benzene ring and a naphthalene ring, with an organic compound having a molecular weight of at least about 1000 and terminal alcoholic hydroxyl groups and selected from the group consisting of a polyester prepared from an excess of a glycol and a dicarboxylic acid, a polyalkylene ether having from 2 to 3 alcoholic hydroxyl groups, and a polythioether glycol, said isocyanate being in excess of that required for reaction with all of said hydroxyl groups, heating the mixture under substantially anhydrous conditions until a product having terminal —NCO groups is formed; mixing the said product having —NCO groups with from about 1 percent to about 10 percent by weight of an organic compound containing groups containing hydrogen atoms reactive with an —NCO group and having a molecular weight of less than about 500, and heating and shaping the mixture to form an elastomer.

4. A method of preparing a polyurethane elastomer which comprises preparing a millable gum by reacting an organic isocyanate having the formula $$OCN-R-N=N-R-NCO$$

wherein R is selected from the group consisting of a benzene ring and a naphthalene ring, with an organic compound having a molecular weight of at least 1000 and terminal alcoholic hydroxyl groups and selected from the group consisting of a polyester prepared from an excess of a glycol and a dicarboxylic acid, a polyalkylene ether having from 2 to 3 alcoholic groups and a polythioether glycol, and a chain extender selected from the group consisting of water and an organic compound having a molecular weight of less than 500 and containing groups containing reactive hydrogen, said isocyanate being less than sufficient to react with all of the reactive hydrogen atoms of the compound having a molecular weight of at least about 1000 and the chain extender, and thereafter reacting the resulting product with additional diisocyanate to form a cured elastomer.

5. The product of the reaction of claim 1.
6. The product of the reaction of claim 2.

References Cited in the file of this patent

UNITED STATES PATENTS

| | | |
|---|---|---|
| 2,671,082 | Stallmann | Mar. 2, 1954 |
| 2,683,144 | Balon et al. | July 6, 1954 |
| 2,691,566 | Kvaines et al. | Oct. 12, 1954 |
| 2,729,618 | Muller et al. | Jan. 3, 1956 |

FOREIGN PATENTS

| | | |
|---|---|---|
| 871,835 | Germany | Mar. 26, 1953 |
| 66,334 | Denmark | Feb. 2, 1948 |

OTHER REFERENCES

Bayer: Angewandte Chemie, 59 (No. 9), 1947.